W. W. BURSON.
Harvester.
No. 21,940.
3 Sheets—Sheet 1.
Patented Nov. 2, 1858.
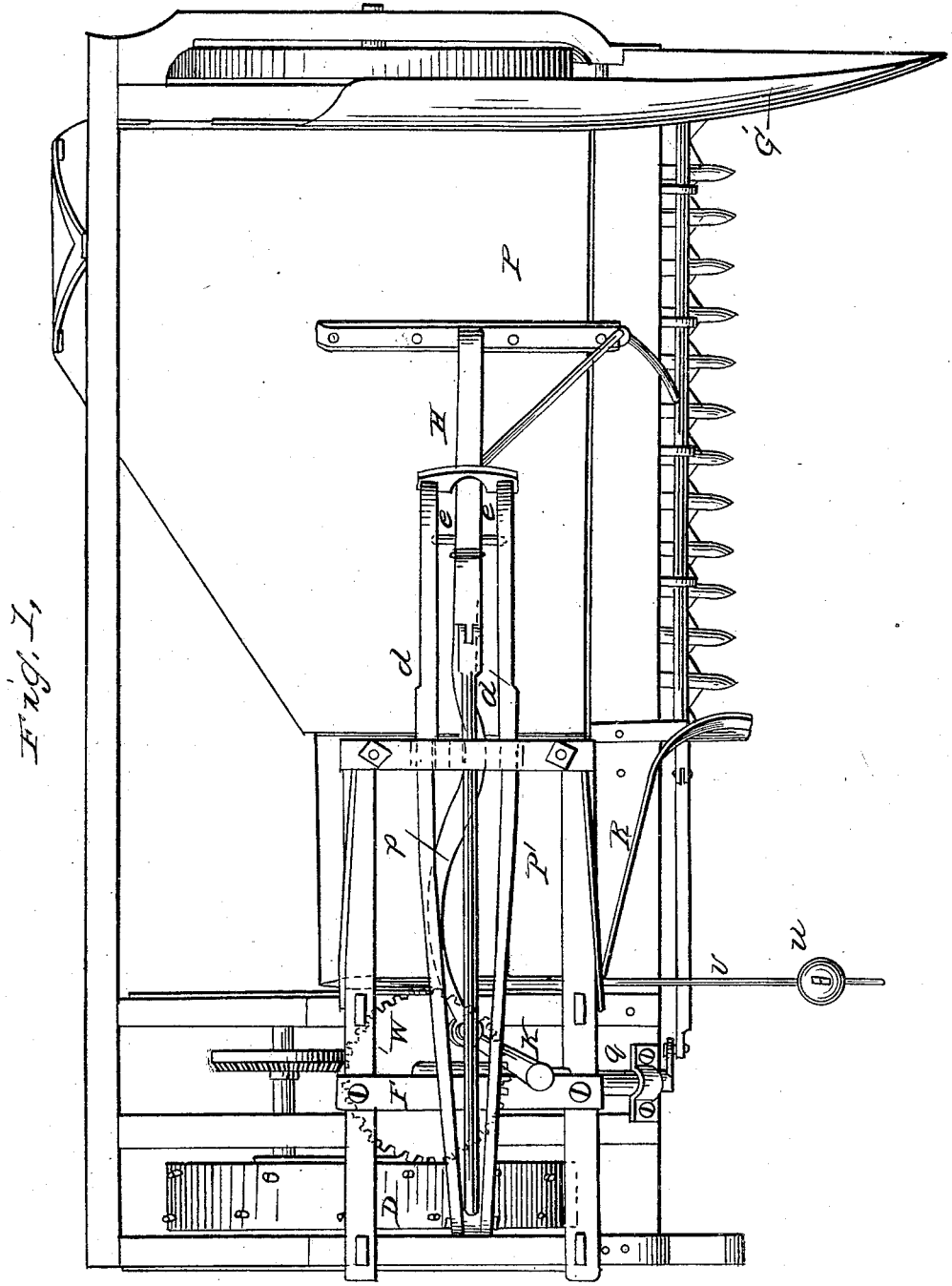

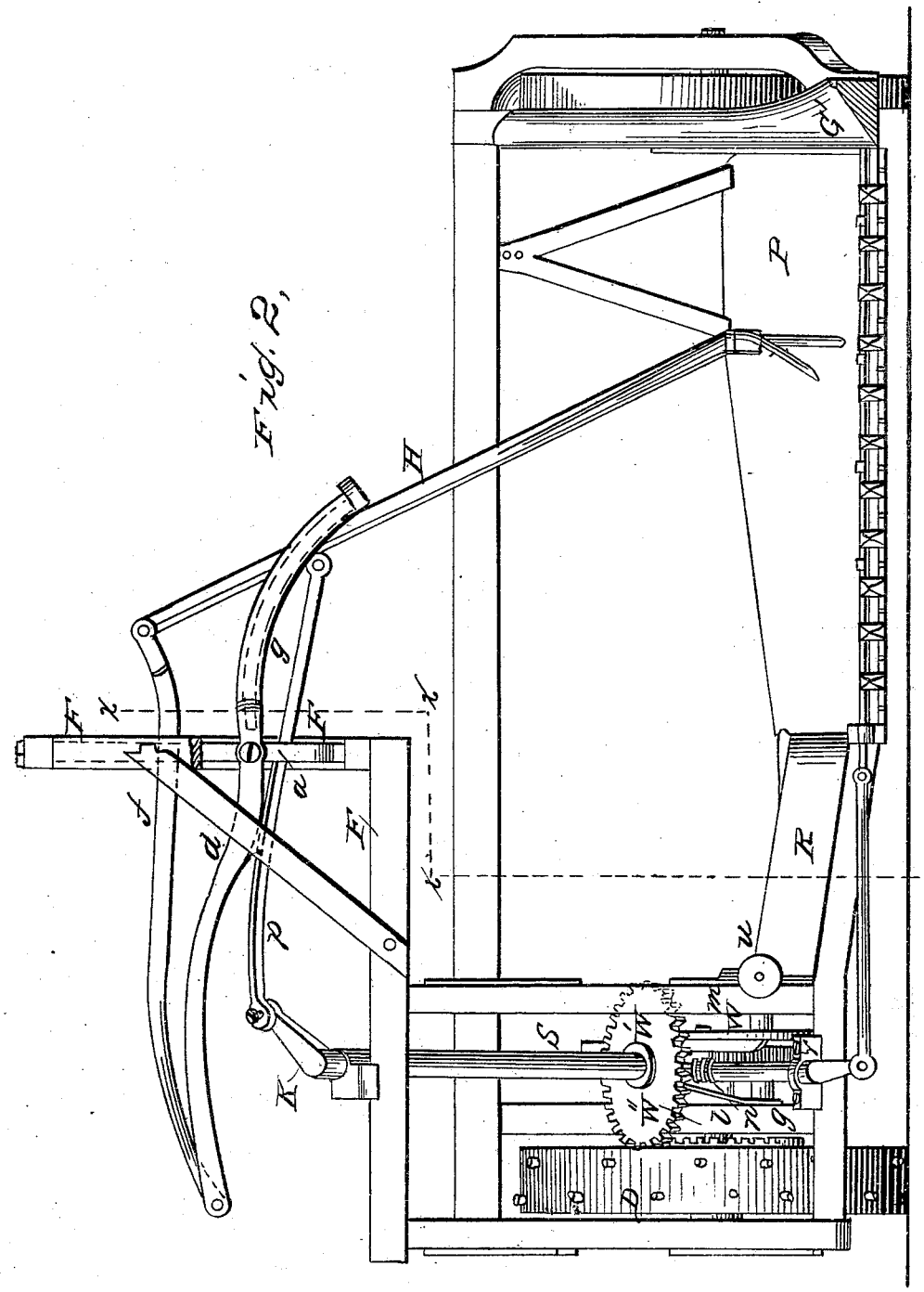

W. W. BURSON.
Harvester.
No. 21,940.
3 Sheets—Sheet 3.
Patented Nov. 2, 1858.
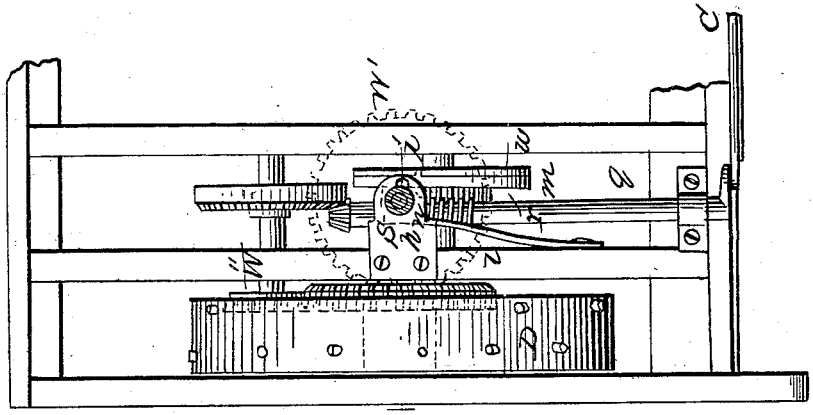
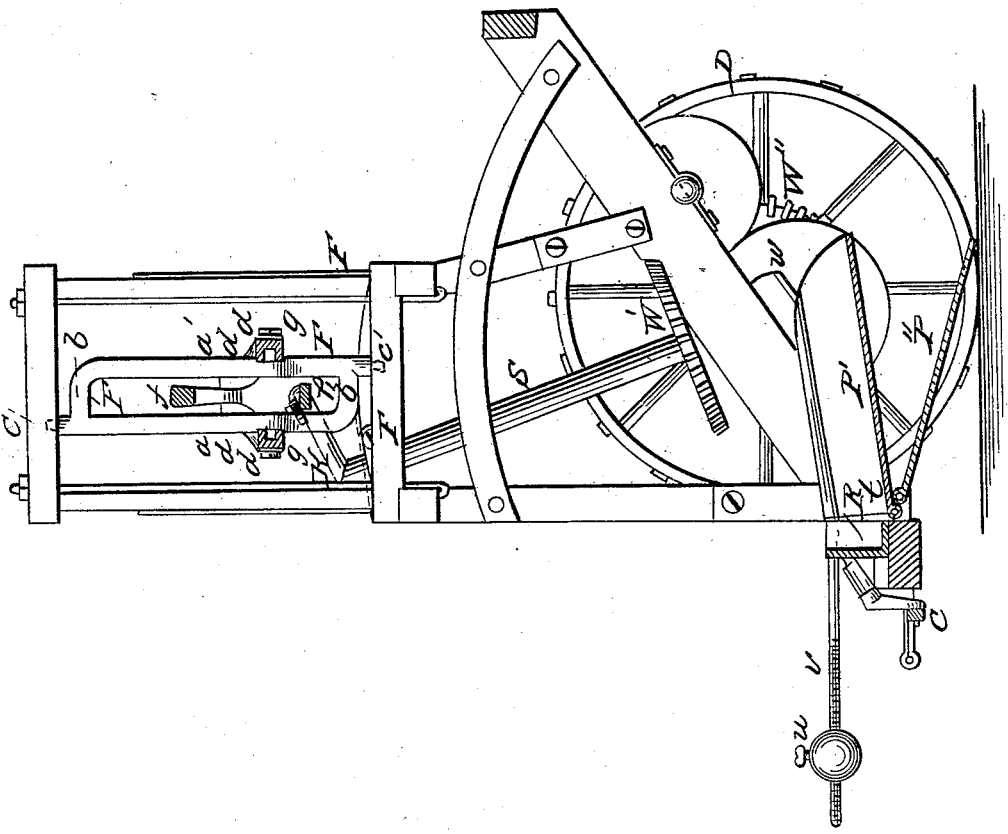

UNITED STATES PATENT OFFICE.

W. W. BURSON, OF YATES CITY, ILLINOIS.

IMPROVEMENT IN RAKING ATTACHMENTS TO HARVESTERS.

Specification forming part of Letters Patent No. 21,940, dated November 2, 1858.

*To all whom it may concern:*

Be it known that I, W. W. BURSON, of Yates City, in the county of Knox and State of Illinois, have invented a new and useful Improvement in Harvesters; and I do hereby declare that the following is a full, clear, and exact description of the same, reference being had to the annexed drawings, forming part of this specification, in the several figures of which similar characters of reference denote the same parts.

Figure 1 is a top view of the machine. Fig. 2 is a front elevation. Fig. 3 is a vertical section on line $xx$. Fig. 4 is a section perpendicular to axis of shaft S under gear-wheel W'.

My invention has reference to the removal of grain from the platform; and it consists in certain combinations of devices, hereinafter to be set forth.

In the drawings, P is the platform which receives the grain after it is severed by the cutters.

F is the frame supporting the raking mechanism.

D is the driving-wheel, and C the cutter-bar.

The raking mechanism is held by a frame, F', composed by sides $a\ a'$ and ends $b\ b'$, the opposite extremities of the sides projecting as journals $c\ c'$, and thus held in the frame-work F, as shown in Fig. 3.

To the sides $a\ a'$ are secured the curved guides $d\ d$, extending on opposite sides of the frame F', as shown in Fig. 2.

The rake-handle H has near its upper extremity trunnions $e\ e$, which move in the grooves $g\ g$, and thus give the draw to the rake as it is moved by the pitman $p$, connecting the handle with the crank K, the extremity of the rake-handle being connected by the rod $f$ with the long extremities of the guides $d\ d$, as shown in Fig. 2. The pitman $p$ passes between pieces $a\ a'$ of frame F', and is curved, as shown in Fig. 1, so as to impart a straight draw to the rake from the rotation of the crank K. This crank K is at the head of shaft S, which rests upon plate $h$, and is capable of lateral movement by reason of slot $i$ in the said plate. This shaft receives its rotation by the meshing of wheel W' with the wheel W'' on main wheel. The cogs of these wheels mesh when cams $m$ on wheel $w$ press against shaft S, the spring $l$ disengaging them when the cams do not act.

The cam-wheel $w$ is rotated by the screw $n$ on shaft $q$ meshing with cog-wheel $r$ upon the side of the cam-wheel. The cams are made so as to be detached, if necessary, so that the time the raking apparatus is in gear may be regulated to the character of grain to be harvested—the lighter the grain the longer the time which the rake is to remain out of gear. The position of the journal $c\ c'$ causes the rake to be elevated as it passes to the rear of the platform; and, moreover, the weight of the raking apparatus is so disposed that when the rake is extended the portion of the apparatus on the platform side of the frame will be heavier than the other portion, and the tendency will be to swing the rake to the front, and thus aid the crank K. When the rake is drawn up, the gear portion of the raking mechanism will be the heaviest, and that portion swinging forward will carry the rake to its proper position over the rear of the platform, the change of the center of gravity of the system serving to adjust the position of the rake during the time its mechanism is out of gear, and from which it will start when its movement again commences.

A portion, P', of the platform is hinged at $t$ and held up by a weight, $u$, movable on a bar, $v$, so as to sustain any desirable weight. Under weighted secondary platform P', and resting on the ground, is a swinging board, P'', Fig. 3, serving to break down the stubble as the machine moves forward, and thus prevent the stubble from interfering with the dropping of the weighted platform P' and the discharge of its load. In front of the platform P' is a glancing-board, R, which prevents the grain from hanging over the cutter-bar as the rake draws it upon tilting platform P'.

In operation the raking mechanism is out of gear and the rake over the middle of the rear portion of the platform when the movement begins. The rake travels in a curved path from its position to the side of the grain-guide G', and then moves along behind the finger-bar, sweeping the grain upon the tilting platform P', which discharges its load when it has received the proper weight, as above stated. The rake then travels to its position over the center of the rear portion of the platform, from whence it started. When it arrives there the wheels W' W'' are out of gear, and the rake remains stationary until the cam of wheel $w$ again causes the rotation of shaft S.

In this machine the whole raking system is operated from crank K, the peculiar hanging of frame F' causing the elevation of the rake when over the rear of the platform, and permitting the change of the center of gravity of the system to adjust the rake to its starting position, and aid the crank when it is moving to the position for raking.

The stubble-depressor P", in connection with the glancing-board R, insures the reception and discharge of the cut grain by the tilting platform P'.

What I claim, and desire to secure by Letters Patent, is—

1. The transverse hinging of frame F', as described, for elevating the rake as it moves to the rear.

2. Adjusting the rake in its position for starting by the gravity of the gear portion o the raking mechanism, combined with the transverse hanging of the frame F', the operation being substantially as described.

3. The combination of the tilting platform P', stubble-leveler P", and glancing-board R with the rake for collecting and delivering the cut product, as specified.

4. The combination of shaft S, cam-wheel $w$, spring $l$, and slotted step $h$, substantially as and for the purpose set forth.

In testimony whereof I have hereunto signed my name before two subscribing witnesses.

W. W. BURSON.

Witnesses:
  GEO. PATTEN,
  JOHN S. HOLLINGSHEAD.